(12) United States Patent
Kojima

(10) Patent No.: US 9,340,173 B2
(45) Date of Patent: May 17, 2016

(54) KNEE PROTECTION AIRBAG APPARATUS

(71) Applicant: TOYODA GOSEI CO., LTD., Kiyosu-shi, Aichi-ken (JP)

(72) Inventor: Takahiro Kojima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/615,642

(22) Filed: Feb. 6, 2015

(65) Prior Publication Data
US 2015/0266445 A1  Sep. 24, 2015

(30) Foreign Application Priority Data

Mar. 19, 2014  (JP) ................................. 2014-056770

(51) Int. Cl.
*B60R 21/217*  (2011.01)
*B60R 21/206*  (2011.01)
*B60R 21/26*   (2011.01)
*B60R 21/16*   (2006.01)

(52) U.S. Cl.
CPC ........... *B60R 21/2171* (2013.01); *B60R 21/206* (2013.01); *B60R 21/26* (2013.01); *B60R 2021/161* (2013.01)

(58) Field of Classification Search
CPC  B60R 21/231; B60R 21/2171; B60R 21/206; B60R 21/26; B60R 2021/23169; B60R 2021/161
See application file for complete search history.

(56) References Cited

U.S. PATENT DOCUMENTS

| | | | | |
|---|---|---|---|---|
| 5,433,471 A | * | 7/1995 | Shepherd | B60R 21/2171 280/728.2 |
| 5,484,163 A | * | 1/1996 | Jenkins | B60R 21/272 280/728.2 |
| 5,887,891 A | * | 3/1999 | Taquchi | B60R 21/2171 280/728.2 |
| 6,161,862 A | * | 12/2000 | Rose | B60R 21/2171 280/728.2 |
| 6,161,865 A | * | 12/2000 | Rose | B60R 21/261 280/728.2 |
| 6,168,185 B1 | * | 1/2001 | Ross | B60R 21/2176 280/728.2 |
| 6,227,560 B1 | * | 5/2001 | Volkmann | B60R 21/2171 280/728.2 |

FOREIGN PATENT DOCUMENTS

JP          2013-71567 A        4/2013

\* cited by examiner

*Primary Examiner* — Drew Brown
(74) *Attorney, Agent, or Firm* — Posz Law Group, PLC

(57) ABSTRACT

A knee protection airbag apparatus is provided with a case, an airbag received in the case, and an inflator received in the case. The inflator includes a gas discharging port at one end side and a connection port portion at the other end side. The connection port portion is exposed through a connector opening of the case. A protruding piece that prevents the inflator from falling-out is formed on a peripheral edge of the connector opening. When the inflator is attached to the case, the inflator is guided by a guide portion to a location where falling-out of the inflator is prevented by the protruding piece.

9 Claims, 10 Drawing Sheets

KNEE PROTECTION AIRBAG APPARATUS

CROSS-REFERENCE TO RELATED APPLICATIONS

This application claims the benefit of Japanese Patent Application No. 2014-056770 (filed on Mar. 19, 2014), the entire contents of which are incorporated herein by reference.

BACKGROUND

1. Technical Field

The present invention relates to a knee protection airbag apparatus, in which an inflator has a generally circular columnar outer shape, a bolt is arranged to protrude from the inflator in a direction perpendicular to an axial direction of the inflator, and the inflator is attached to a case by protruding the bolt from the case and then fastening a nut to the bolt.

2. Related Art

Patent Document 1 discloses a knee protection airbag apparatus in which an inflator is attached to a case using a retainer. The inflator is attached to the case by protruding a bolt, which is arranged on the retainer with the inflator retained therein, from the case and then fastening a nut to the bolt. According to the knee protection airbag apparatus, in a side wall of a peripheral wall portion of the case, which is arranged on a connection port portion side of the inflator, an connector opening is formed to expose the connection port portion therethrough so that a connector can be connected to the connection port portion in a state where the inflator has been attached to the case, and on the peripheral edge of the connector opening, a protruding piece is formed to partially protrude from the peripheral edge of the connector opening. The protruding piece is provided to prevent the connection port portion side of the inflator from being protruded from the case upon operation of the inflator, i.e., to prevent the inflator from being fallen out through the connector opening. Also, according to the knee protection airbag apparatus, a protrusion is formed to protrude toward the inflator in a part of a bottom wall portion of the case near to a side wall having the protruding piece, and the protruding piece is configured to press an end surface on a peripheral edge of the connection port portion of the inflator when the inflator is abutted against the protrusion.

Patent Document 1: JP-A-2013-071567

However, according to the knee protection airbag apparatus, an outer peripheral surface of the inflator is not always abutted against the protrusion, but the outer peripheral surface of the inflator can be abutted against the protrusion only when the inflator is oscillated in a direction perpendicular to an axial direction thereof upon operation. Also, according to the knee protection airbag apparatus, the protruding piece is configured to press the end surface of the connection port portion side of the inflator even if the inflator is inclined to cause the end of the connection port portion side to be away from the protruding piece. Namely, in the knee protection airbag apparatus, because the end of the connection port portion side of the inflator is not positioned relative to the case in a vehicle-mounted state, it is inevitable that upon operation the inflator is inclined along the axial direction, and also it is necessary that the protruding piece is set to have a large size to some extent, thereby pressing the end surface of the inflator even in such an inclined state.

SUMMARY

One or more embodiments of the invention provides a knee protection airbag apparatus, in which even if a protruding piece is small, the protruding piece can accurately press an end surface of a connection port portion side of an inflator.

According to one or more embodiments, a knee protection airbag apparatus is provided with a case, an airbag folded and received in the case, and an inflator that is received in the case and that supplies an inflation gas to the airbag. The case has a box shape including a bottom wall portion, a tubular peripheral wall extending from a peripheral edge of the bottom wall portion, and a protruding opening through which the airbag is capable of protruding. The inflator includes a gas discharging port arranged on one end side of the inflator in an axial direction to discharge the inflation gas, and a connection port portion arranged on the other end side of the inflator to be connected to a connector connected with a lead wire extending from an airbag operation circuit. The inflator has a bolt arranged to protrude in a direction perpendicular to the axial direction, and the inflator is attached to the case by protruding the bolt from the case and fastening a nut to the bolt. An connector opening is formed on a side wall of the peripheral wall portion of the case at a side of the connection port portion of the inflator, and the connection port portion is exposed through the connector opening so that the connector is connected to the connection port portion of the inflator attached to the case. A protruding piece that prevents the inflator from falling-out is formed on a peripheral edge of the connector opening. A guide portion is formed at a location on the peripheral edge of the connector opening, which is located more toward an inside of the case in the axial direction than the protruding piece. An outer peripheral part of the connection port portion side of the inflator slides on the guide portion when the inflator is attached to the case so that the inflator is guided by the guide portion to a location where falling-out of the inflator is prevented by the protruding piece. The guide portion includes guide surfaces arranged to oppose to each other in a direction perpendicular to the axial direction of the inflator. The guide surfaces are arranged so that a spacing distance therebetween is decreased toward a moving direction of the inflator when fastening the nut to the bolt.

According to the knee protection airbag apparatus, the guide portion is formed on the peripheral edge of the connector opening of the case to guide the inflator to a location, where falling-out thereof is prevented by the protruding piece, by sliding along an outer peripheral part of the connection port portion side of the inflator, when the inflator is attached to the case. The guide portion includes guide surfaces arranged to oppose each other in a direction perpendicular to an axial direction of the inflator, and the guide surfaces are arranged so that a spacing distance therebetween is decreased toward a moving direction of the inflator when fastening the nut to the bolt. Therefore, when the nut is fastened to the bolt protruding from the case upon attaching of the inflator to the case, accompanying with a relative pulling movement of the bolt, the inflator itself is also moved so that a part of the connection port portion side thereof enters between the guide surfaces. Also, the inflator is moved while sliding the outer peripheral part of the connection port portion side thereof on the two guide surfaces, and thus the guide surfaces sandwich the inflator therebetween. Accordingly, the outer peripheral part of the connection port portion side of the inflator can be accurately supported by the guide portion.

The inflator is guided to the location where falling-out thereof is prevented by the protruding piece formed on the peripheral edge of the connector opening, and thus the protruding piece can press an end surface of the connector port portion side. Further, according to the knee protection airbag apparatus, an outer peripheral surface of the inflator in the vicinity of an end of the connection port portion side thereof can be supported by the guide portion in the vehicle-mounted state, and therefore, upon operation of the inflator, the inflator can be inhibited from being oscillated in the direction perpendicular to the axial direction. As a result, even if the protruding piece is not set to have a large size, the protruding piece can accurately press an end surface on the peripheral edge of the connection port portion of the inflator upon operation, and thus the inflator can be prevented from being fallen out through the connector opening. In addition, according to the knee protection airbag apparatus, because there is no problem even if the protruding piece is not set to have a large size, in other words, an increased opening area of the connector opening can be ensured, thereby facilitating an operation of connecting the connector to the connection port portion of the inflator, which has been attached to the case.

Therefore, according to the knee protection airbag apparatus, even if the protruding piece is small, the protruding piece can accurately press an end surface of the connection port portion side of the inflator.

The inflator may include an inflator body and a retainer for retaining the inflator body, and the retainer has the bolt arranged thereon.

When the knee protection airbag apparatus has the above configuration, the inflator can be easily manufactured and an increase in manufacturing cost can be inhibited, as compared with a case where a blot protrudes from an inflator itself. Also, the airbag may be folded in a state where only the retainer is received therein, and after the airbag has been completely folded, the inflator may be inserted into the retainer arranged in the airbag. Therefore, an operation of folding the airbag and an operation of inserting the inflator can be performed at different sites separated from each other, thereby enhancing the degree of freedom in operation of assembling the apparatus.

The case may include two side members including a left wall portion and a right wall portion arranged to oppose to each other in a left-right direction of the peripheral wall portion, and a main body including the bottom wall portion and two opposing wall portions of the peripheral wall portion arranged in a direction perpendicular to the side members. The inflator may be attached to the bottom wall portion. At least one of the side members may have a stepped portion in which a part of the stepped portion in a side of the bottom wall portion is located inward in the left-right direction and a part of the stepped portion in a side near to the protruding opening is located outward in the left-right direction, and the connector opening is arranged across the stepped portion. The protruding piece may be arranged in a part of the peripheral edge of the connector opening of the side member in a side of the protruding opening, and the guide portion may be arranged in a part of the peripheral edge in a side of the bottom wall portion.

In the knee protection airbag apparatus of the above configuration, the guide portion and the protruding piece are all formed together in the side member, and therefore, an error in arrangement position thereof relative to each other can be hardly incurred, as compared with a case where a guide portion and a protruding piece are respectively arranged in different members. Also, as compared with a case where the case is integrally formed by deep drawing or the like, the case can be cheaply manufactured.

Further, in the knee protection airbag apparatus, if the connector opening is formed in each of the side members, the case can be used in common for both of a case, where the inflator is mounted in a vehicle in such a manner that the connection port portion is located on the right side, and a case, where the inflator is mounted in a vehicle in such a manner that the connection port portion is located on the left side. For example, this is preferable in that the case can be used in common for both of a case, where the airbag apparatus is arranged in front of an assistant driver's seat, and a case, where the airbag apparatus is arranged in front of a driver's seat, thereby reducing manufacturing costs.

DETAILED DESCRIPTION

Figure 1:
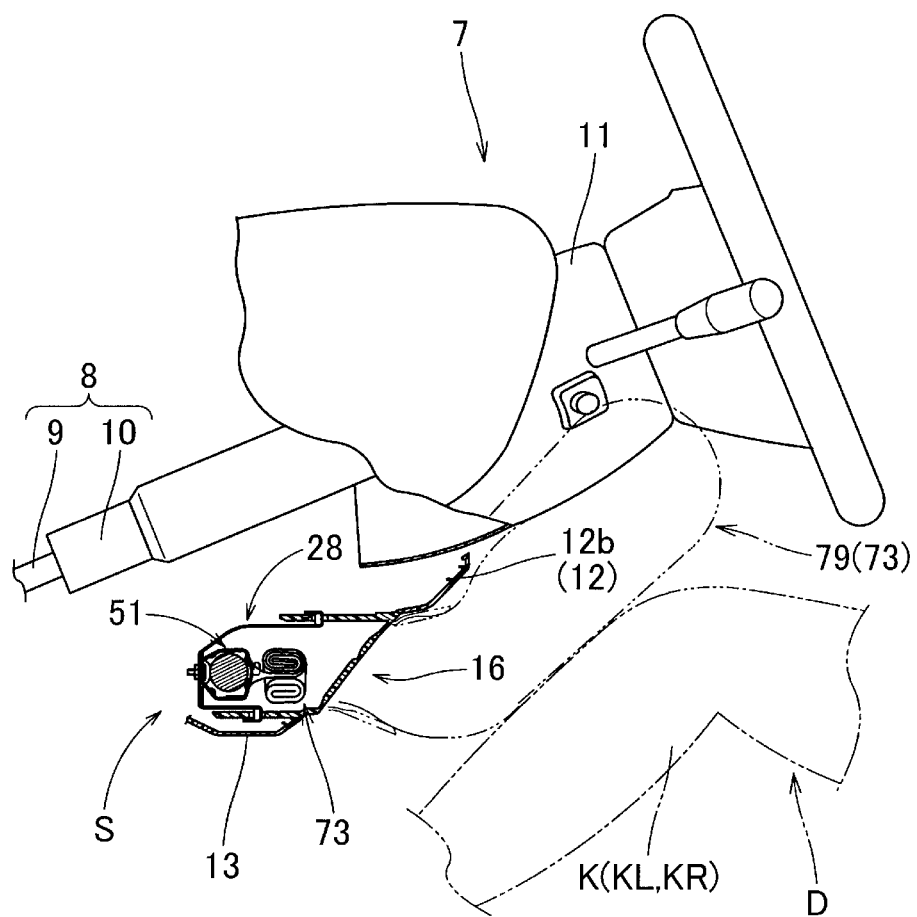
FIG. 1 is a schematic longitudinal sectional view showing a usage state of a knee protection airbag apparatus according to one embodiment, as taken along a front and rear direction of a vehicle.
Figure 4:
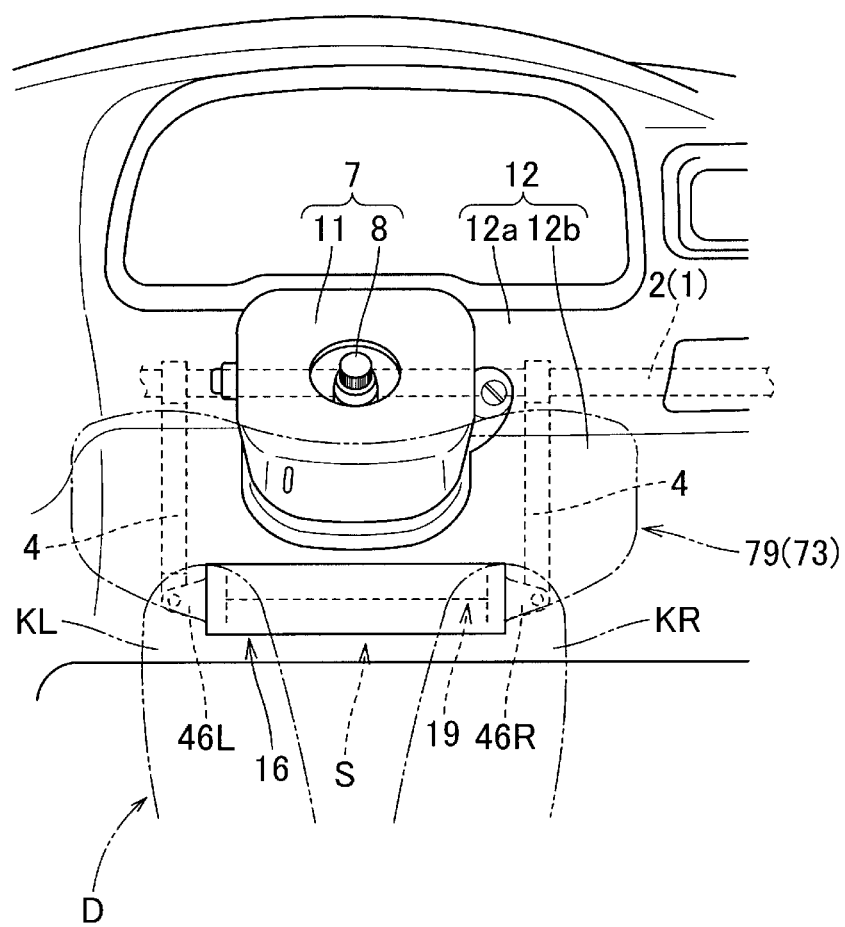
FIG. 4 is a schematic front view showing a usage state of the knee protection airbag apparatus according to the embodiment, as viewed from a rear side of the vehicle.

One embodiment of the present invention will be now described with reference to the accompanying drawings. As shown in FIGS. 1 and 4, a knee protection airbag apparatus (hereinafter, simply referred to as an airbag apparatus) S according to the embodiment is arranged below an steering column 7, which is located on a vehicle front side of a driver D as a passenger, to protect knees K (KL and KR) of the driver D. Meanwhile, unless otherwise specified, upward-downward, left-right and front-rear directions as used herein correspond respectively to upward-downward, left-right and front-rear directions of a vehicle when the airbag apparatus S has been mounted in the vehicle.

The steering column 7, as shown in FIGS. 1 and 4, has a column body 8 and a column cover 11 covering an outer periphery of the column body 8. As shown in FIGS. 1 and 4, the column body 8 is constituted of a main shaft 9 and a column tube 10 covering a periphery of the main shaft 9.

Figure 2:
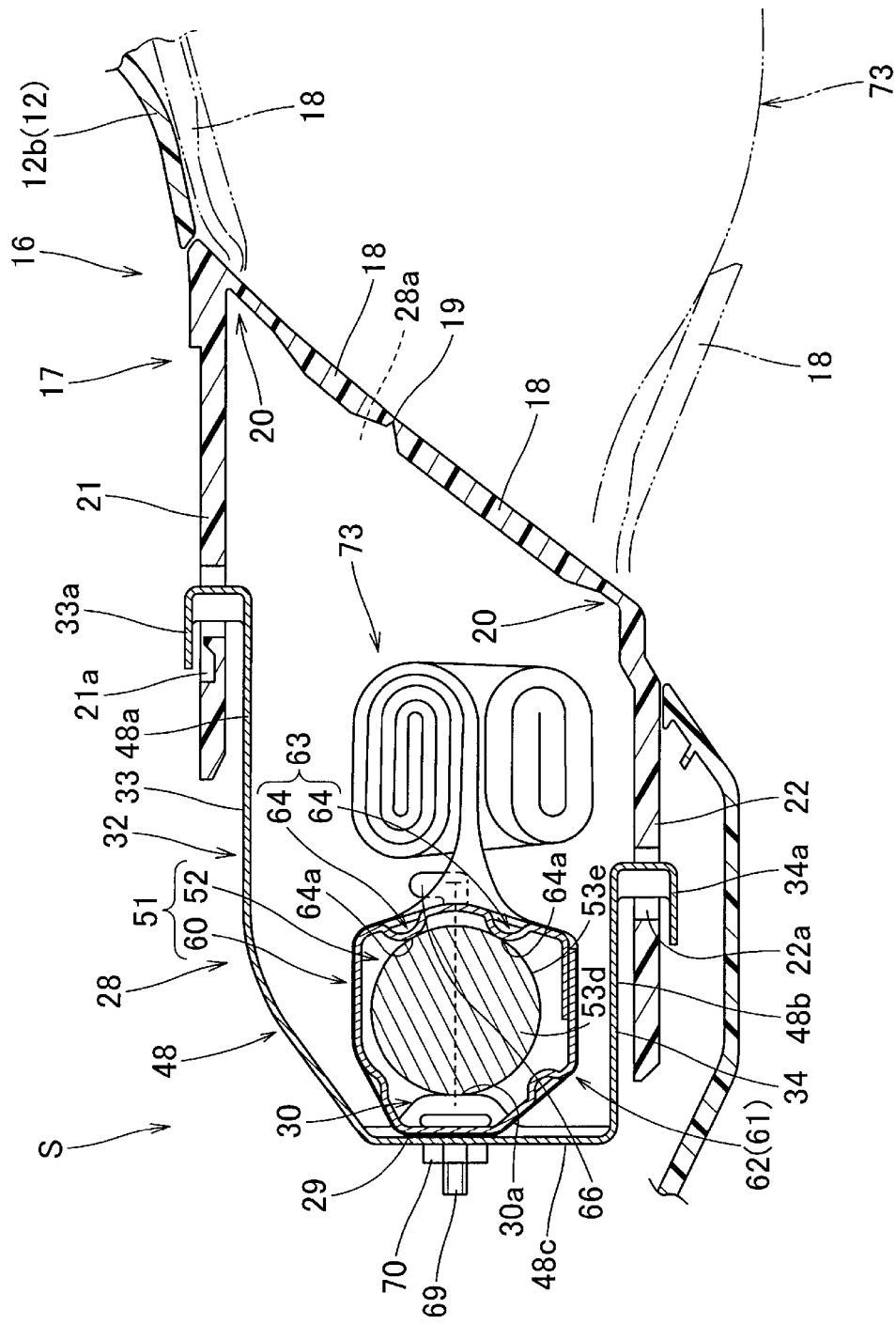
FIG. 2 is an enlarged schematic longitudinal sectional view of the knee protection airbag apparatus according to the embodiment, as taken along the front and rear direction of the vehicle.
Figure 3:
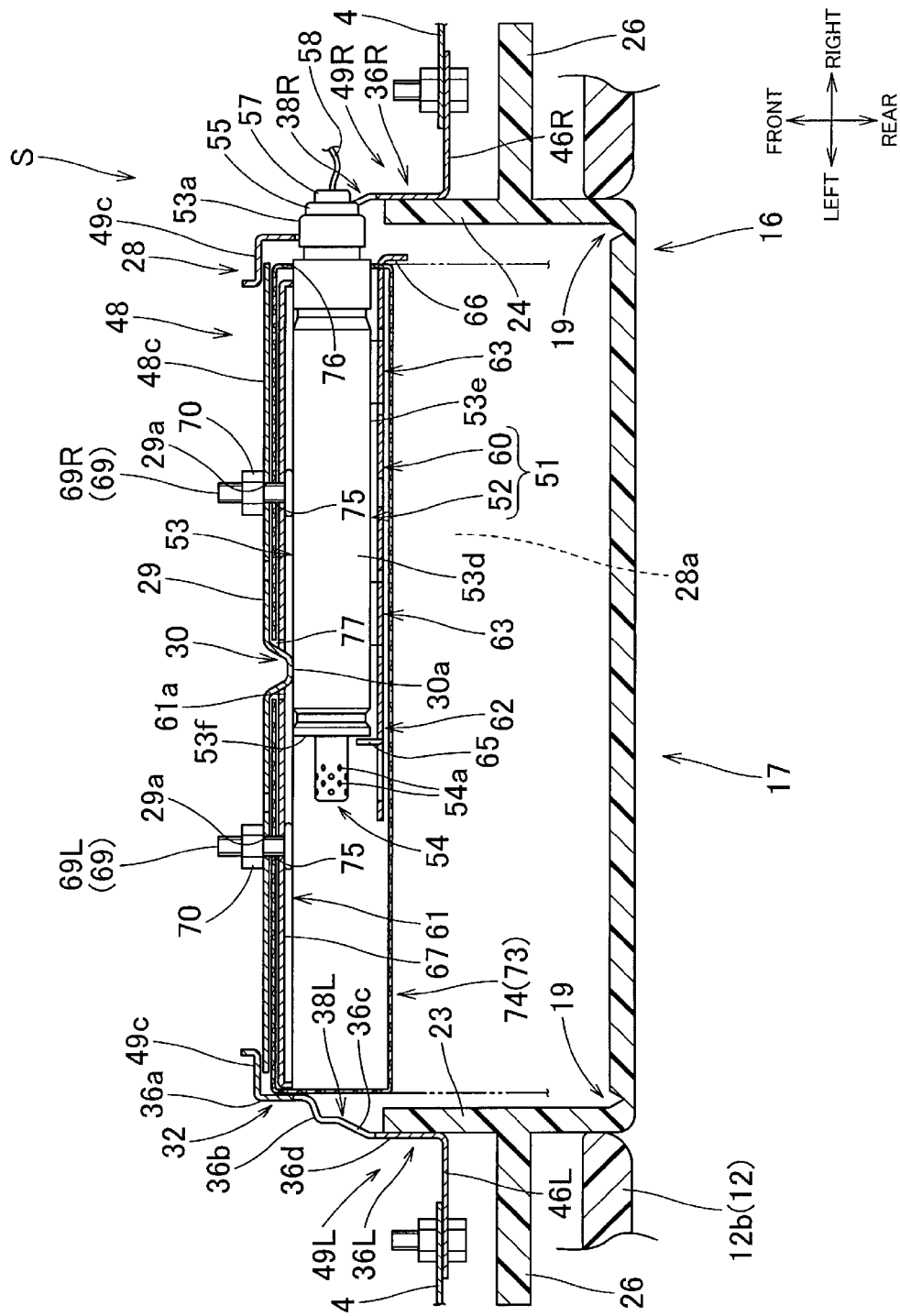
FIG. 3 is a schematic cross sectional view of the knee protection airbag apparatus according to the embodiment, as taken along a left and right direction of the vehicle.

As shown in FIGS. 2 and 3, the airbag apparatus S includes a folded airbag 73, an inflator 51 for supplying an inflation gas to the airbag 73, a case 28 adapted to receive the folded airbag 72 and the inflator 51 therein and opened on the vehicle rear side, and an airbag cover 16 adapted to cover a vehicle rear side of a protrusion opening 28a of the case 28.

The airbag cover 16, which is formed of polyolefin-based thermoplastic elastomer, is configured to cover a vehicle rear side of the case 28. As shown in FIGS. 1 to 4, the airbag cover 16 is arranged on a lower panel 12b side of an instrument panel 12 constituted of an upper panel 12a and the lower panel 12b. In the embodiment, the airbag cover 16 has a door installation portion 17 arranged near to the protruding opening 28a of the case 28 and a peripheral edge portion 26 extending around the door installation portion 17.

The door installation portion 17 has a door portion 18 covering the door opening 28a of the case 28, attaching piece portions 21 and 22 extending forward from both sides of the door portion 18 in the upward-downward direction and adapted to attach the airbag cover 16 to the case 28, and side wall portions 23 and 23 extending forward from both sides of the door portion 18 in the left-right direction. The door portion 18 is of a generally rectangular plate shape covering a vehicle rear side of the protruding opening 28a of the case 28. In the embodiment, the door portion 18 has, on a periphery thereof, a thin breakable portion 19 arranged to have a generally H shape as viewed from the vehicle rear side, and hinge portions 20 arranged on both ends thereof in the upward-downward direction to serve as a pivot center upon opening, and thus is configured to be opened toward both sides in the upward-downward direction upon opening. The attaching piece portions 21 and 22 are respectively arranged to be adjacent to outer peripheries of an upper wall portion 33 and a lower wall portion 34 of the case 28, as described below, and to protrude toward the vehicle frond side. The attaching piece portions 21 and 22 have, on front end sides thereof, locking holes 21a and 22a opened in a rectangular shape to allow locking claws 33a and 34a formed on the case 28 to be locked therein and each arranged at five locations along the left-right direction to correspond to the locking claws 33a and 34a. The side wall portions 23 and 24 are arranged to be respectively adjacent to inner peripheries of a left wall portion 36L and a right wall portion 36R of the case 28, as described below, and to protrude toward the vehicle front side. Specifically, the side wall portions 23 and 24 are configured so that distal ends thereof are respectively located near to a boundary between a distal end portion 36d and an inclined portion 36c in each of the left wall portion 36L and the right wall portion 36R (see FIG. 3). The peripheral edge portion 26 is configured in a stepped shape to be recessed by one step more toward the vehicle front side than the door portion 18 in both left and right side parts of the door installation portion 17 (see FIG. 3).

Figure 5:
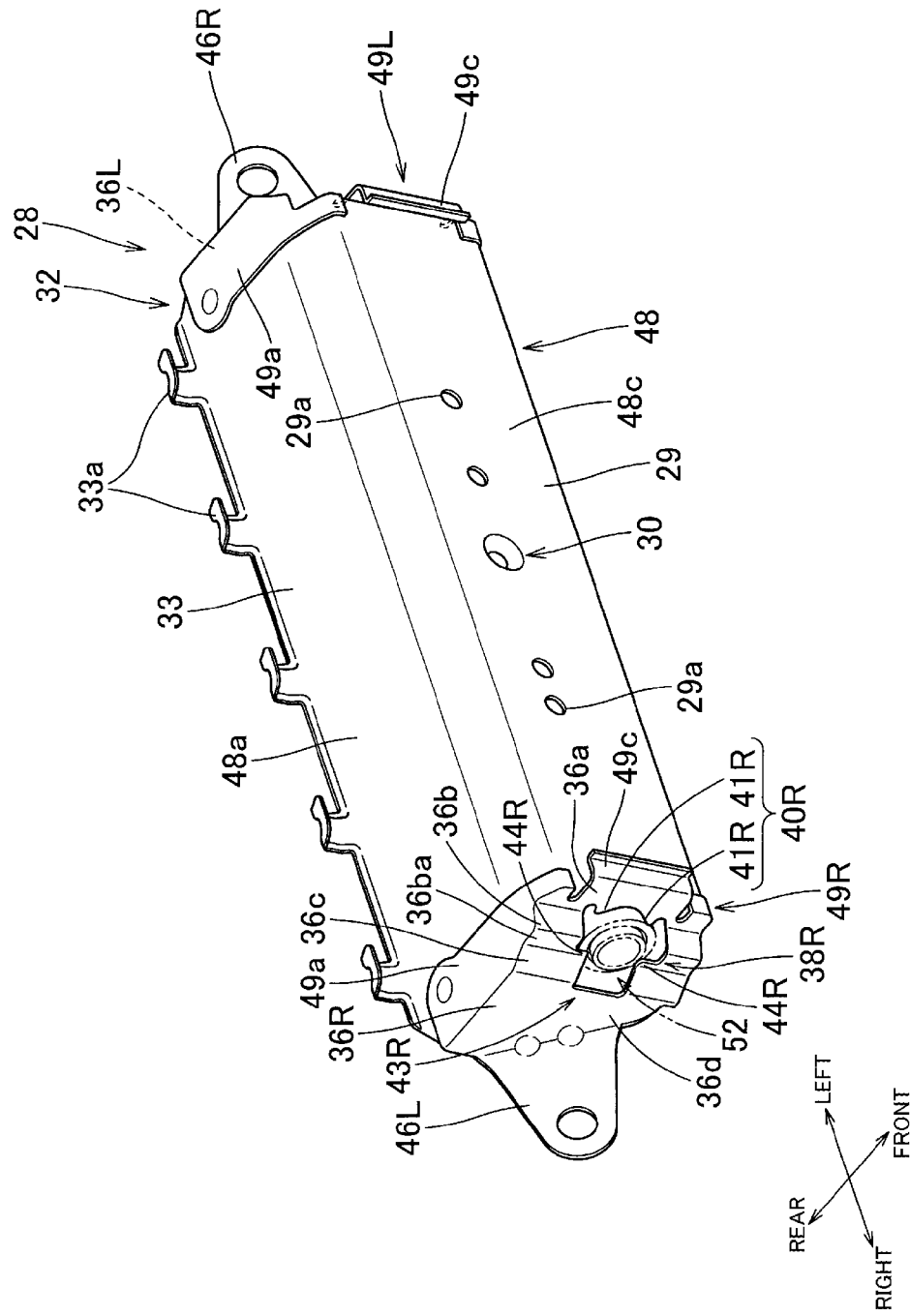
FIG. 5 is a schematic front view showing a case used in the knee protection airbag apparatus according to the embodiment, as viewed from a front side of the vehicle.

The case 28 is made of sheet metal and in the embodiment, as shown in FIGS. 2, 3, 5 to 7, has a generally rectangular-shaped bottom wall portion 29 arranged on a vehicle front side thereof and a generally rectangular tubular peripheral wall 32 extending from a peripheral edge of the bottom wall portion 29 rearward along the front-rear direction. Thus, the case 28 is of a generally box shape having the protruding opening 28a defined on a rear end side of the peripheral wall portion 32 to allow the airbag 73 to protrude therethrough. Also, in the embodiment, the case 28, as shown in FIG. 5, are configured so that two side members 49L and 49R, by which the left side wall portion 36L and the right side wall portion 36R of the peripheral wall portion 32 are respectively formed, and one main body member 48, by which the upper wall portion 33 and the lower wall portion 34, which are two opposing wall portions of the peripheral wall portion 32 arranged in a direction perpendicular to the side members 49L and 49R, and the bottom wall portion 29 are formed, are fused with each other at predetermined locations thereon.

Specifically, the main body member 48 has an upper wall 48a forming the upper wall portion 33, a lower wall 48b forming the lower wall portion 34, and a bottom wall 48c forming the bottom wall portion 29. Also, each of the side members 49L and 49R has an upper collar portion 49a extending toward the upper wall 48a, a lower collar portion 49b extending toward the lower wall 48b, and a bottom collar portion 49c extending toward the bottom wall 48c. The case 28 is formed by spot-welding each upper collar portion 49a to the upper wall 48a and spot-welding each lower collar portion 49b to the lower wall 48b. Also, the side members 49L and 49R are bilaterally symmetric.

If described in detail, the bottom wall portion 29 is of a generally rectangular plate shape having a wide width in the left-right direction and has insertion hole 29a and 29a provided at two locations thereon along the left-right direction to allow bolts 69 (69L and 69R), as described below, provided on a retainer 60 to be inserted therethrough. Also, at a location on the bottom wall portion 29, which corresponds to substantially the middle between the insertion holes 29a and 29a, a support protrusion 30 is formed to protrude toward an inside of the case 28 (toward the inflator 51) generally along a protruding direction of the bolts 69. The support protrusion 30, which is of a generally truncated cone shape, is configured so that when being mounted in a vehicle, a generally flat surface-shaped distal end 30a thereof is abutted against an outer peripheral surface 53e of a middle section 53d of a main body portion 53, as described below, of an inflator body 52, thereby supporting the inflator body 52 (see FIGS. 2 and 3). The support protrusion 30 is formed at a location on the bottom wall portion 29, which corresponds to substantially the middle thereof in the left-right direction.

The peripheral wall 32 has the upper wall portion 33 and the lower wall portion 34, which oppose each other in the upward-downward direction, and the left wall portion 36L and the right wall portion 36R, which oppose each other in the left-right direction. In the vicinities of rear ends of the upper wall portion 33 and the lower wall portion 34, the locking claws 33a and 34a on which peripheral edges of the locking holes 21a and 22a formed in the attaching piece portions 21 and 22 of the airbag cover 16 are respectively locked is formed to protrude outward in the upward-downward direction and also to be bent in a generally L-shaped cross-section shape so that a distal end thereof is oriented toward the vehicle front side. The locking claws 33a and 34a are respectively formed at five locations on the upper wall portion 33 and the lower wall portion 34 along the left-right direction.

In the embodiment, the left wall portion 36L and the right wall portion 36R are configured to be bilaterally symmetric. In the embodiment, the right wall portion 36R arranged near to a connector 57 of the inflator body 52 will be described in detail by way of example.

Figure 7:
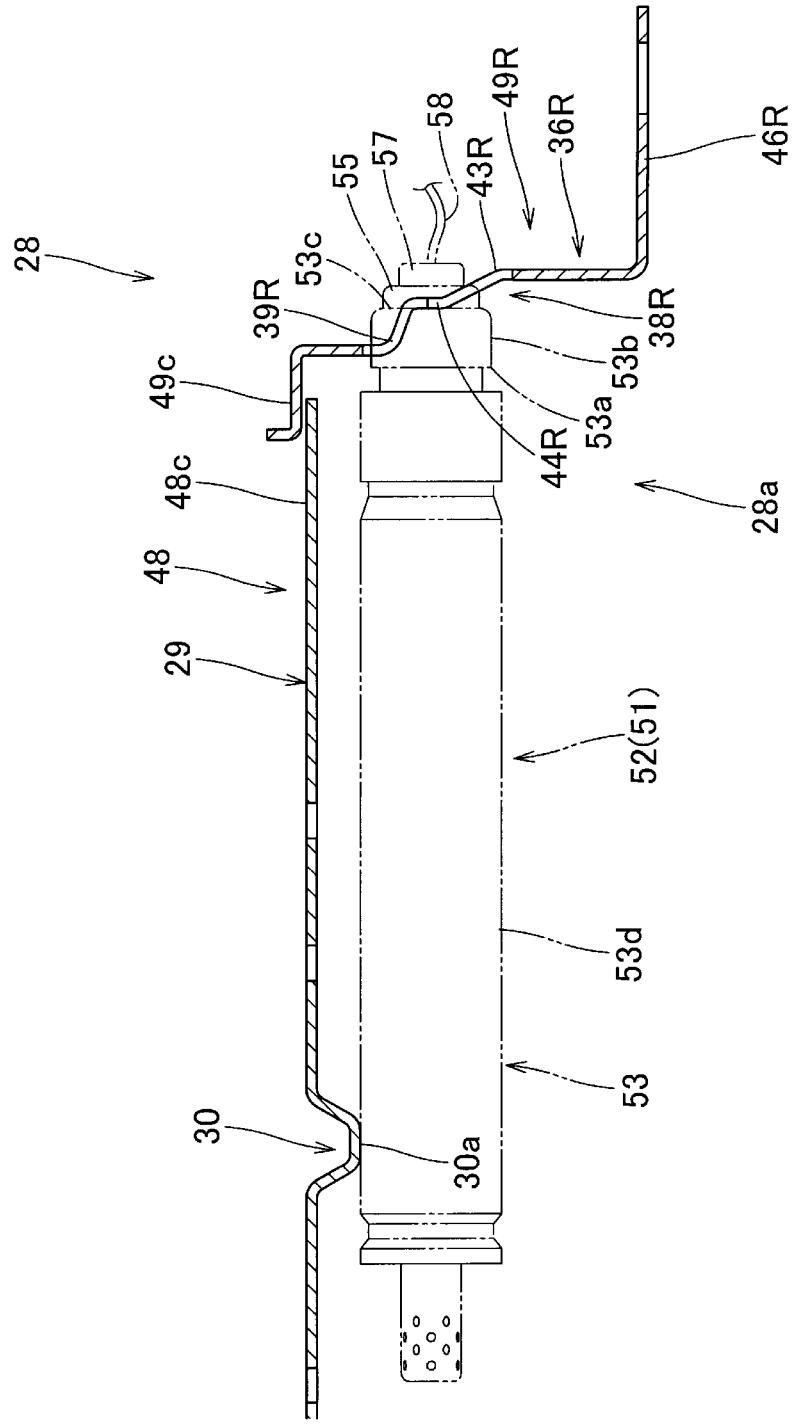
FIG. 7 is a partially enlarged cross sectional view of the case of FIG. 5.

The right wall portion 36R is configured to be stepped in such a manner that a side (front end side) thereof near to the bottom wall portion 29 is located inward (on the left side) in the left-right direction and a side (rear end side) thereof near to the protruding opening 28a is located outward (on the right side) in the left-right direction. Specifically, the right wall portion 36R, as shown in FIGS. 5 and 7, is configured to be stepped in a cross section thereof taken along a horizontal direction, in such a manner that between a front base portion 36a and a rear distal end portion 36d thereof generally arranged along the front-rear direction, a stepped portion 36b formed to be bent and an inclined portion 36c connected to the stepped portion 36b and inclined toward the distal end portion 36d are arranged. The stepped portion 36b is formed in a stepped shape to be connected to the base portion 36a and also to orient a rear section 36*ba* thereof outward in the left-right direction, and the inclined portion 36 is inclinedly formed so that an front end side thereof connected to the rear section 36*b* of the stepped portion 36*b* is oriented inward in the left-right direction and a rear end side thereof connected to the distal end portion 36*d* is oriented outward in the left-right direction.

Figure 6:
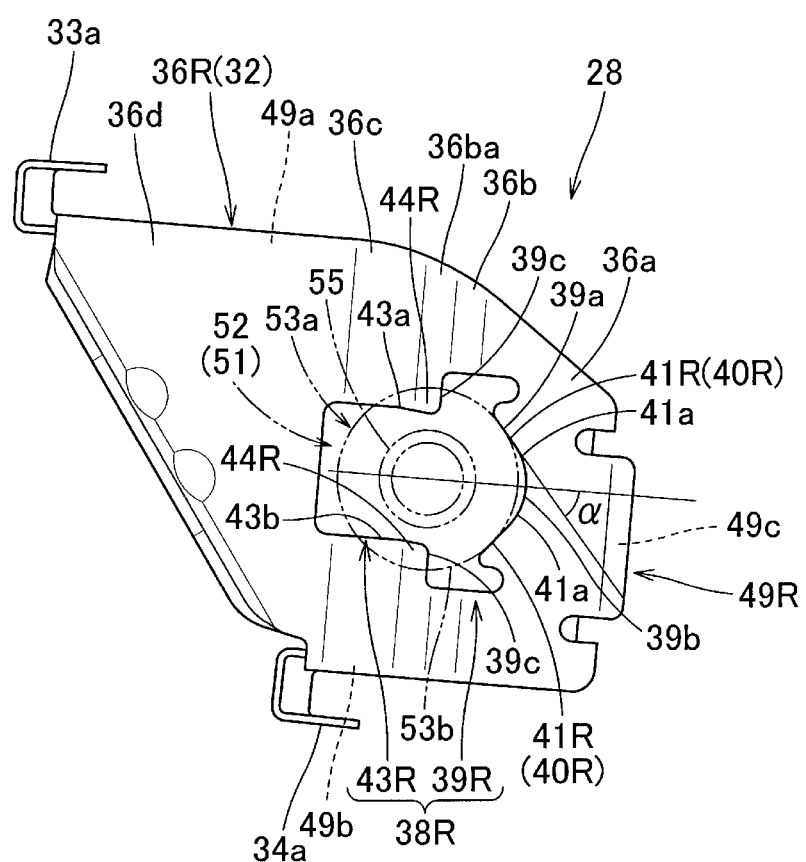
FIG. 6 is a right side view of the case of FIG. 5.

Also, the right wall portion 36R has a connector opening 38R formed to expose a connection port portion 55 and thus to allow the connector 57 to be connected to the connection port portion 55 in a state where the inflator 51 has been attached to the case 28. As shown in FIGS. 5 to 7, the connector opening 38R is formed to extend from the base portion 36*a* to the distal end portion 36*d* and thus to extend across the stepped portion 36*b*, and in particular, has a main opening 39R formed in a region extending from the base portion 36*a* to a middle section of the stepped portion 36, and an auxiliary opening 43R formed in a region extending from a rear end side of the stepped portion 36*b* to the distal end portion 36*d*.

As shown in FIG. 6, the main opening 39R is configured, as viewed from the right side, to have a wide width in the upward-downward direction and also to have a front edge 39*a* curved to be widened toward a rear side thereof (a side near to the protruding opening 28*a*). The main opening 39R allows only the connection port portion 55 of the inflator body 52 to be inserted therethrough and thus is sized not to allow the inflator body 52 itself (main body portion 53) to be inserted therethrough. Specifically, the main opening 39R has an opening width dimension in the upward-downward direction set to be larger than an outer diameter dimension of a right end section 53*a* of the inflator body 52, so that an approximately half region of the right end section 53*a* can be exposed (see FIG. 6). Also, a section of the main opening 39R near to the curved front edge 39*a* forms a guide portion 40R for guiding the inflator body 52 to a location, where falling-out thereof is prevented by protruding pieces 44R, when the inflator 51 is attached to the case 28. The guide portion 40R has guide surfaces 41R opposing each other in the upward-downward direction, which is a direction perpendicular to an axial direction of the inflator body 52, and having a spacing distance therebetween decreased toward the bottom wall portion 29. In other words, the guide surfaces 41R are formed so that the spacing distance is deceased toward a moving direction of the inflator body 52 when fastening a nut 70 to the bolt 69, and in the embodiment, are arranged to be generally symmetrically inclined in the upward-downward direction. Also, the guide surfaces 41R are configured so that when fastening the nut 70 to the bolt 69, the guide surfaces 41R are slid along a part of an outer peripheral surface 53*b* of the right end section 53*a* of the inflator body 52, which corresponds to the connection port portion 55 side thereof, while being kept abutted against the outer peripheral surface 53*b* of the right end section 53*a* of the inflator body 52, which corresponds to the connection port portion 55 side thereof. Specifically, the guide surfaces 41R are configured so that an inclined angle α thereof to an axial direction of the bolt 69 (direction perpendicular to the bottom wall portion 29) is set to approximately 50*o* (see FIG. 6) and distal ends 41*a* and 41*a* thereof near to the bottom wall portion 29 are smoothly connected to each other by a curved section 39*b* curved in a generally circular arc shape.

Figure 10A:
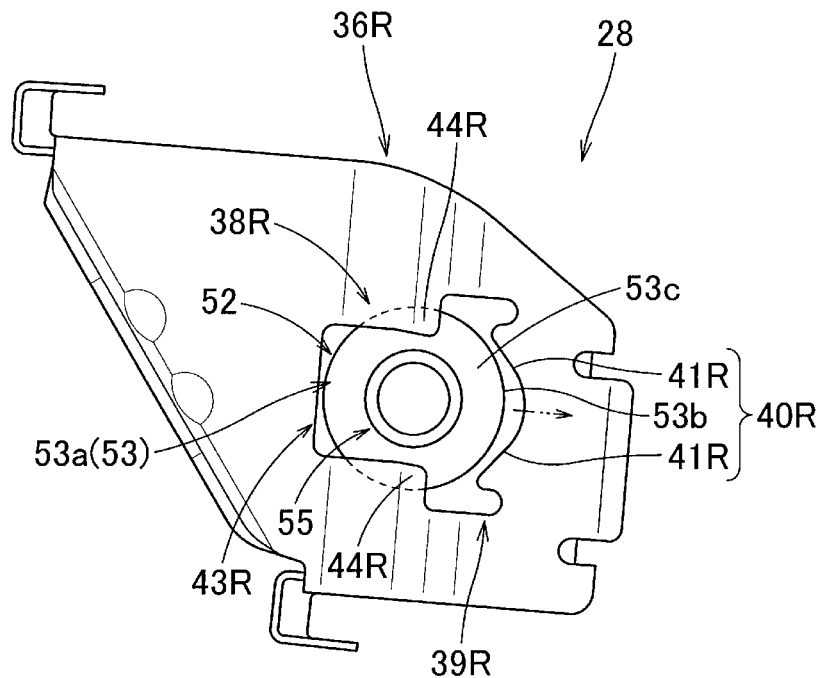
FIG. 10A is a schematic right side view explaining a state where a main body of an inflator is received in the case in the knee protection airbag apparatus according to the embodiment.
Figure 10B:
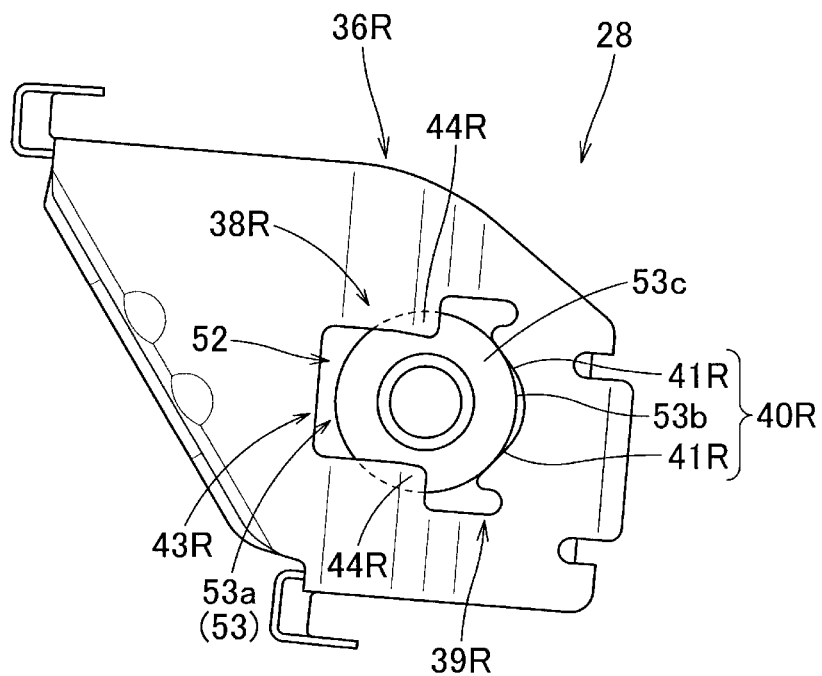
FIG. 10B is a schematic right side view explaining the state where the main body of the inflator is received in the case in the knee protection airbag apparatus according to the embodiment.

Also, the guide portion 40R has a spacing distance thereof from the auxiliary opening 43R dimensioned in such a manner that in a state where the outer peripheral surface 53*b* of the right end section 53*a* of the inflator body 52, which corresponds to the connection port portion 55 side thereof, is supported by the guide surfaces 41R (a state where the inflator 51 has been attached to the case 28), as shown in FIG. 10B, the protruding pieces 44R and 44R can press a right end surface 53*c* on a peripheral edge of the connection port portion 55 of the inflator body 52. In addition, the main opening 39R is configured so that a rear edge 39*c* thereof connected to the auxiliary opening 43R is of a straight line shape generally perpendicular to an upper edge 43*a* and a lower edge 43*b* of the auxiliary opening 43R.

The auxiliary opening 43R is of a generally rectangular shape dimensioned to have an opening width dimension in the upward-downward direction set to be smaller than that of the main opening 39R, and is formed to be communicated with the main opening 39R and to extend rearward (toward the protruding opening 28*a*). The auxiliary opening 43R is likewise dimensioned to have the opening width dimension allowing the connection port portion 55 of the inflator body 52 to be inserted therethrough.

Also, in the embodiment, parts of a peripheral edge of the connector opening 38R, which are located in the vicinity of a boundary between the auxiliary opening 43R and the main opening 39R, form the protruding pieces 44R for preventing falling-out of the inflator 51. The protruding pieces 44R, which are formed at two locations opposing each other in a direction (upward-downward direction) perpendicular to an axial direction of the bolt 69 formed on the retainer 60, are formed in a rear end region (rear section) of the stepped portion 36*b* in the right wall portion 36R. Namely, the protruding pieces 44R are arranged more outward along an axial direction of the inflator 51 (inflator body 52) than the guide portion 40R arranged in a region of the base portion 36*a* of the right wall portion 36R, and when the nut 70 is fastened to the bolt 69 to attach the inflator 51 to the case 28, parts thereof near to the outer peripheral surface 53*b* of the right end section 53*a* can press the right end surface 53*c* on the peripheral edge of the connection port portion 55 of the inflator body 52 supported by the guide portion 40R (see FIGS. 7, 10A and 10B).

In the case 28 according to the embodiment, the attaching piece portions 46L and 46R are respectively formed to extend from rear edges of the left wall portion 36L and the right wall portion 36R outward in the left-right direction (see FIG. 3). The attaching piece portions 46L and 46R are parts intended to attach the case 28 to a body 1 of a vehicle. The attaching piece portions 46L and 46R are arranged in front of the peripheral edge portion 26 of the airbag cover 16 when being mounted in the vehicle, and as shown in FIG. 4, are configured to be connected to brackets 4 extending an instrument panel reinforcement 2 on the body 1. In the embodiment, the attaching piece portions 46L and 46R are integrally formed with the left wall portion 36L and the right wall portion 36R, and thus together with the left wall portion 36L and the right wall portion 36R, are formed by the side members 49L and 49R. Meanwhile, although not shown in detail, the left wall portion 36L (side member 49L) has likewise a connector opening 28L formed therein as shown in FIG. 3, and the connector opening 38L has the same configurations as those of the connector opening 38R formed in the outer wall portion 36R.

As shown in FIG. 3, the inflator 51 has the inflator body 52 having a generally circular columnar outer shape, and the retainer 60 for retaining the inflator body 52.

The inflator body 52 is of a generally circular columnar shape, of which an axial direction is arranged to extend along the left-right direction, and has the large diameter main body portion 53*a* and a small diameter gas discharging portion 54 formed to protrude from one end of the main body portion 53 in the left-right direction. The gas discharging portion 54 has a plurality of gas discharging ports 54*a* formed to discharge an inflation gas. In the embodiment, the gas discharging portion 54 is arranged on a left end side of the main body portion 53. On a right end side of the main body portion 53, the connection port portion 55 is formed to connect the connector 57, to which a lead wire 58 for inputting an operation signal is connected (see FIGS. 10A and 10B). In the inflator main body 52 according to the embodiment, the right end section 53a of the main body portion 53, which corresponds to the connection port portion 55 side thereof, has a diameter slightly smaller than that of the middle section 53d. Also, in the inflator main body 52 according to the embodiment, the connection port portion 55 has a diameter smaller than that of the right end section 53a of the main body portion 53 and is formed to protrude from the right end surface 53a of the main body portion 53 toward the right side (see FIGS. 3 and 7).

Figure 8:
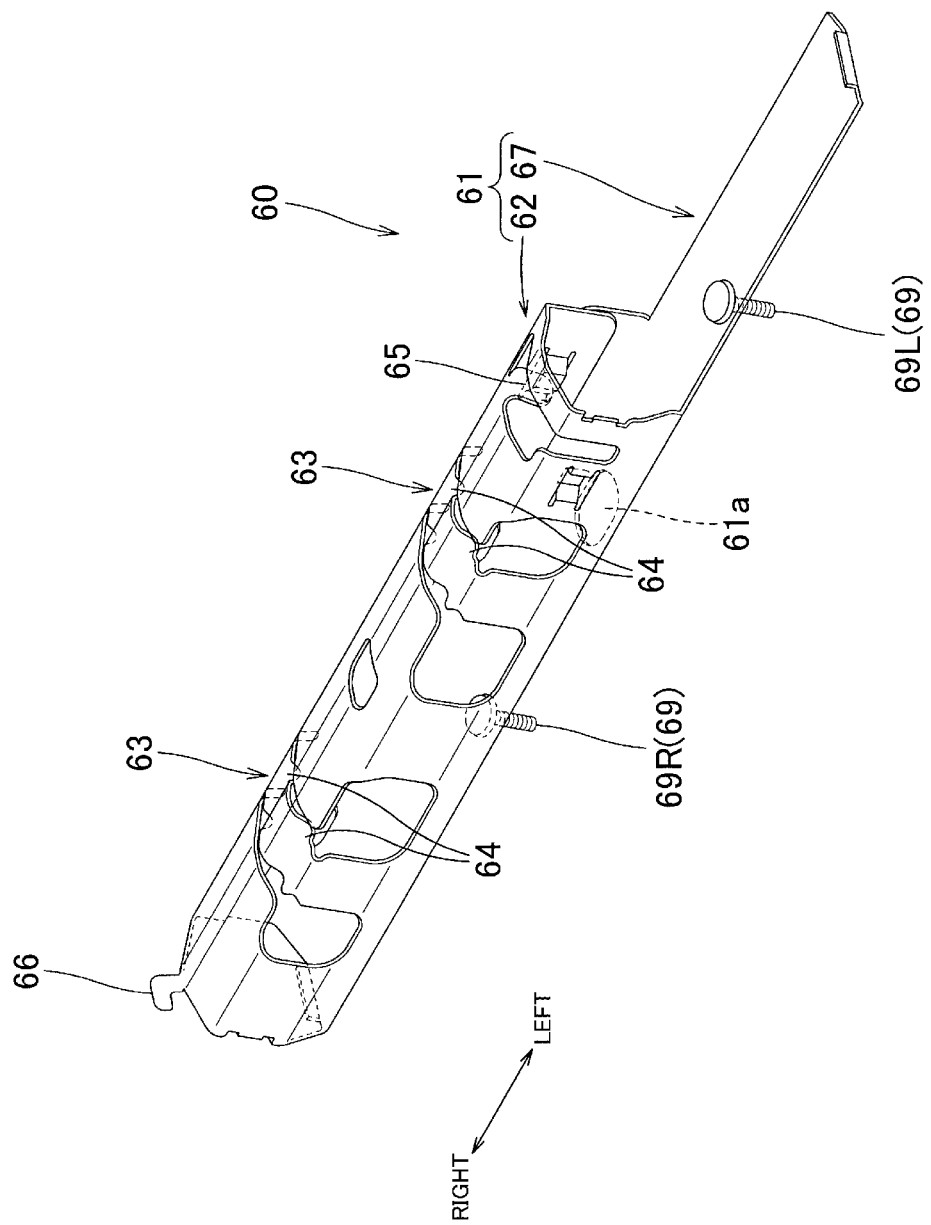
FIG. 8 is a perspective view showing a retainer used in the knee protection airbag apparatus according to the embodiment.

As shown in FIGS. 3 and 8, the retainer 60 has a retaining portion 61 for retaining the inflator main body 53 and two bolts 69L and 69R formed to protrude generally perpendicularly to an axial direction of the retaining portion 61. The bolts 69L and 69R are arranged to protrude from the bottom wall portion 29 of the case 28 toward the vehicle front side when being mounted in the vehicle.

As shown in FIG. 8, the retaining portion 61, which is made of sheet metal, has a tubular portion 62 for retaining the inflator main body 52 and a plate-shaped portion 67 extending from a left end of the tubular portion 62 toward the left side. The plate-shaped portion 67 is of a flat plate shape extending generally along the bottom wall portion 29 of the case 28, and the left bolt 69L is arranged to protrude from the plate-shaped portion 67. In a part of the retaining portion 61, which is located between the bolt 69L and the bolt 69R and also in front of the inflator main body 2 when being mounted in the vehicle, a through-hole 61 is formed to allow the support protrusion 30 formed on the bottom wall portion 29 of the case 28 to be inserted therethrough. Also, on a part of the tubular portion 62, which is arranged in the rear of the main body portion 53 of the inflator body 52 when being mounted in the vehicle, abutting portions 63 are formed to be abutted against the outer peripheral surface 53e of the middle section 53d of the main body portion 53 when being mounted in the vehicle. As shown in FIG. 3, the abutting portions 63 are formed at two locations, which respectively correspond to the left and right sides of the right bolt 69R, so that the right bolt 69R is positioned therebetween. As shown in FIG. 2, each abutting portion 63 has two protrusions 64 and 64 aligned generally along the upward-downward direction in a front half region thereof as viewed in a cross section take along the front-rear direction. Each protrusion 64 is formed so that the tubular portion 62 is partially recessed toward the inflator body 52, in other words, protruded toward the inflator body 52. Also, each protrusion 64, which is of a generally semicircular arc-shaped outer shape, is configured so that a distal end surface 64a thereof is abutted against the outer peripheral surface 53e of the middle section 53d of the main body portion 53 of the inflator body 52.

Also, in the vicinity of a left end of the tubular portion 62, a protruding piece 65 for positioning the inflator body 2 when the inflator body 52 has been inserted therein is formed to protrude from an inner periphery thereof. As shown in FIG. 3, the protruding piece 65 is abutted against an end surface (left end surface 53f) of the gas discharging portion 54 in the main body portion 53 of the inflator body 5 to limit a movement of the main body portion 53 toward the left side, thereby positioning the gas discharging portion 54 inside the retainer 60. In addition, the tubular shape 62 has, on a right end side thereof, a locking claw portion 66 formed to protrude from an opening slit 76 for inserting the inflator, as described below, when the retainer 60 has been received in the airbag 73 through the opening slit 76 and then the airbag 73 has been folded (see FIGS. 2 and 3). The locking claw portion 66 is formed in a generally L shape to protrude from a rear edge when being mounted in the vehicle and then to be bent upward at a distal end side thereof. The airbag apparatus S according to the embodiment is configured so that upon assembling, the airbag 73 is folded with the retainer 60 received therein and then the inflator body 52 is inserted into the airbag 73 through the opening slit 76 to be inserted into the retaining portion 61 (tubular portion 62) of the retainer 60, and accordingly, the locking claw portion 66 is provided to prevent the retaining portion 61 of the retainer 60 received in the airbag 73 from being dislocated relative to the opening slit 76.

Also, the airbag apparatus S according to the embodiment is configured so that when the inflator body 52 has been received in the retaining portion 61 of the retainer 60 arranged in the airbag 73 and then the airbag 73 has been received in the case 28, the inflator 51 is attached to the case 28 by protruding the bolts 69 of the retainer 60 from the bottom wall portion 29 of the case 28 and fastening the nuts 70 to the bolts 69. Specifically, when the nuts 70 are fastened, the inflator body 52 is sandwiched by the support protrusion 30 formed on the bottom wall portion 29 of the case 28, the guide portion 40R formed on the front edge side of the connector opening 38R of the right wall portion 36R of the case 28, and the abutting portions 63 and 63 formed in the retaining portion 61 of the retainer 60, and thus retained by the retainer 60.

In the embodiment, the airbag 73 is formed of a woven fabric made of flexible polyester or polyamide yarns or the like. Also, the airbag 73 has a generally rectangular plate shape, as shown by a two-dot chain line in FIGS. 1 and 4, upon completion of inflation and is configured to protect left and right knees K (KL and KR) of a driver D. In the embodiment, the airbag 73, as shown in FIG. 9, has an attaching portion 74 arranged in the case 28 upon completion of inflation and a protective inflation portion 79 having a width in the left-right direction wider than that of the attaching portion 74 and adapted to protect knees K (KL and KR) of the driver D upon completion of inflation.

Figure 9:
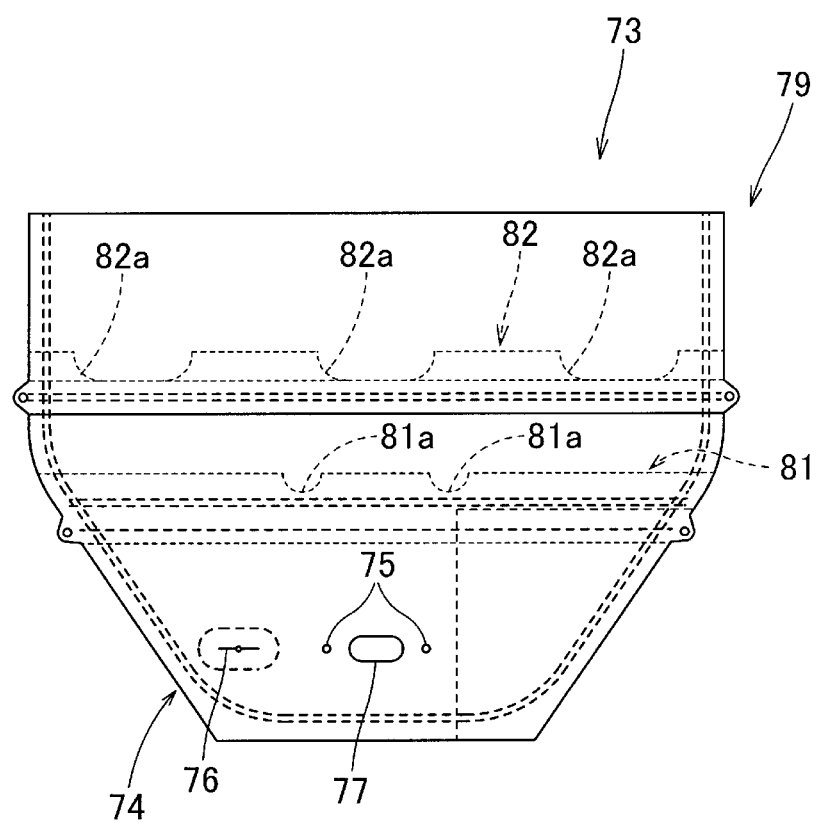
FIG. 9 is a rear view showing an airbag used in the knee protection airbag apparatus according to the embodiment.

As shown in FIG. 9, the attaching portion 74 has two insertion holes 75 and 75, the opening slit 76 and a through-hole 77 formed therein. The insertion holes 75 and 75 are respectively intended to allow the bolts 69 of the retainer 60 to be inserted therethrough. The opening slit 76 is intended to allow the retainer 60 and the inflator body 52 to be inserted in the airbag 73, and is of a straight line shape generally along the left-right direction in a state where the airbag 73 has been flatly deployed as a single body. The through-hole 77 is intended to allow the support protrusion 30 formed on the bottom wall portion 29 of the case 28 to be inserted therethrough and is formed between the insertion holes 75 and 75.

Also, in the airbag 73 according to the embodiment, two tethers 81 and 82 for limiting a thickness upon completion of inflation are arranged, in the inside thereof, to be spaced from each other in the upward-downward direction and to extend generally along the lift-right direction (see FIG. 9). The tether 81 is arranged to partition the attaching portion 74 and the protective inflation portion 79 and the tether 82 is arranged to partition regions of the protective inflation portion 79. The tethers 81 and 82 have respectively a plurality of gas flow holes 81a and 82a for allowing the inflation gas to flow therethrough.

Next, procedures of mounting the airbag apparatus S of the embodiment on the vehicle will be described. First, the retainer 60 is received in the airbag 73 through the opening slit 76 in such a manner that the bolts 69 are protruded through the insertion holes 75. Subsequently, in a state where the locking claw portion 66 formed on the tubular portion 62 are protruded through the opening slit 76, the airbag 73 is folded to be able to be received in the case 28 and then is wrapped around by a breakable wrapping material, not shown, for preventing collapsing of such a folded state. At this time, a peripheral part of the opening slit 76 is left exposed through the wrapping material.

Then, the inflator body 52 is inserted, at the gas discharging port 54 side thereof, into the airbag 73 (into the tubular portion 62 of the retainer 60) via the opening slit 76. At this time, the inflator body 52 is inserted until the left end surface 53*f* of the main body portion 53 is abutted against the protruding piece 65 formed on the tubular portion 62 of the retainer 60. Subsequently, the folded airbag 73 and the inflator 51 are received in the case 28 in such a manner that the bolts 69 protrude from the bottom wall portion 29, and then the nuts 70 are fastened to the bolts protruding from the bottom wall portion 29, thereby attaching the airbag 73 and the inflator 51 to the case 28. Upon fastening of the nuts 70, the retainer 60 moves the tubular portion 62, which covers the outer periphery of the inflator body 52, toward the bottom wall portion 29. Also, the inflator body 52 is reversely pressed toward the vehicle rear side in such a manner that the support protrusion 30 formed on the bottom wall portion 29 is abutted at the distal end 30*a* thereof against the outer peripheral surface 53*e* of the middle section 53*d* of the main body portion 53 in the inflator body 52, thereby causing the outer peripheral surface 53*e* of the middle section 53*d* of the main body portion 53 in the inflator body 52 to be abutted against the distal end surface 64*a* of each protrusion 63 of the abutting portion 63 formed in the tubular portion 62. At this time, also, the right end section 53*a* of the main body portion 53 of the inflator body 52, which corresponds to the connection port portion 55 side thereof, is abutted at the outer peripheral surface 53*b* thereof against the guide surfaces 41R and 41R of the guide portion 40R formed on the front edge 39*a* side of the main opening 39R of the connector opening 38R formed in the right wall portion 36R of the case 28, and while the outer peripheral surface 53*b* is kept abutted against the guide surfaces 41R and 41R, the inflator body 52 is moved toward the bottom wall portion 29 and thus supported by the guide portion 40R (see FIGS. 10A and 10B). The inflator body 52 is retained by the retainer 60 as the middle section 53*d* of the main body portion 53 is sandwiched by the distal end surfaces 64*a* of four protrusions 64 arranged on the vehicle rear side and the distal end 30*a* of one protrusion 30 arranged on the vehicle front side, and also is attached to the case 28 as a vehicle front side of the right end section 53*a* is supported by the guide portion 40R.

Subsequently, when the airbag cover 16 is mounted on the case 28 in such a manner that the locking claws 33*a* and 34*a* are respectively locked on the peripheral edges of the locking holes 21*a* and 22*a*, an airbag assembly can be assembled. Then, the airbag assembly is attached and fixed to the body 1 using the brackets 4 and 4, and the connector 57 to which the lead wire 58 extending from an airbag operation circuit is connected is connected to the connection port portion 55 of the inflator body 52 exposed through the connector opening 38R of the case 28. Subsequently, when the instrument penal 12 or an undercover 13 (see FIGS. 1 and 2) is attached, it is possible to attach the airbag apparatus S to a vehicle.

After the airbag apparatus S has been mounted in the vehicle, an inflation gas is discharged from gas discharging port 54*a* of the inflator body 52 and flowed into the airbag 73 if an operation signal is inputted to the inflator body 52 via the lead wire 58. The airbag 73 is inflated by allowing the inflation gas to be flowed therein, thereby breaking the wrapping material, not shown, and also pressing the door portion 18 of the airbag cover 16. Thus, the door portion 18 is opened in the upward-downward direction using as a pivot center the hinge portions 20, while breaking the breakable portion 19 on the periphery thereof. Then, the airbag 73 protrudes through the protruding opening 28*a* of the case 28 toward the vehicle rear side, thereby completing inflation thereof as shown by a two-dot chain line in FIGS. 1 and 4.

According to the airbag apparatus S of the embodiment, the guide portion 40R is formed on the peripheral edge of the connector opening 38R of the case 28 to guide the inflator body 52 to a location where falling-out thereof is prevented by the protruding pieces 65, by sliding along a part of the outer peripheral surface 53*b* of the right end section 53*a* of the inflator body 52, which corresponds to the connection port portion 55 side thereof, when the inflator 51 is attached to the case 28. The guide portion 40R has the guide surfaces 41R and 41R arranged to oppose each other in the upward-downward direction, which is a direction perpendicular to an axial direction of the inflator 51 (inflator body 52), and the guide surfaces 41R and 41R are arranged so that a spacing distance therebetween is decreased toward a moving direction of the inflator body 52 when fastening the nuts 70 to the bolts 69, i.e., toward the bottom wall portion 29. Therefore, when the nuts 70 are fastened to the bolts 69 protruding from the case 28 upon attaching of the inflator 51 to the case 28, accompanying with a relative pulling movement of the bolts 69, the inflator body 52 itself, as shown in FIGS. 10A and 10B, is also moved so that the right end section 53*a* corresponding to the connection port portion 55 side thereof enters between the guide surfaces 41R and 41R. Also, the inflator body 52 is moved while sliding a part of the outer peripheral surface 53*b* of the right end section 53*a* of the inflator body 52, which corresponds to the connection port portion 55 side thereof, on the two guide surfaces 41R and 41R, and thus, the guide surfaces 41R and 41R sandwich the right end section 53*a* of the inflator body 52 therebetween. Accordingly, the outer peripheral surface 53*b* of the right end section 53*a* of the inflator body 52, which corresponds to the connection port portion 55 side thereof, can be accurately supported by the guide portion 40R.

Also, at this time, the inflator body 52 is guided to the location where falling-out thereof is prevented by the protruding pieces 44R formed on the peripheral edge of the connector opening 38R, and thus the protruding pieces 44R can press the right end surface 53*c* of the connector port portion 55 side (see FIG. 10B). Further, according to the airbag apparatus S of the embodiment, an outer peripheral surface (outer peripheral surface 53*b* of the right end section 53*a*) of the inflator body 52 in the vicinity of an end of the connection port portion 55 side thereof can be supported by the guide portion 40R in the vehicle-mounted state, and therefore, upon operation of the inflator 51 (inflator body 52), the inflator body 52 can be inhibited from being oscillated in the direction perpendicular to the axial direction. As a result, even if the protruding pieces 44R are not set to have a large size, the protruding pieces 44R can accurately press an end surface (right end surface 53*c*) on the peripheral edge of the connection port portion 55 of the inflator body 52 upon operation, and thus the inflator body 52 can be prevented from being fallen out through the connector opening 38R. In addition, according to the airbag apparatus S of the embodiment, because there is no problem even if the protruding pieces 44R are not set to have a large size, in other words, an increased opening area of the connector opening 38R can be ensured, thereby facilitating an operation of connecting the connector 57 to the connection port portion 55 of the inflator body 52, which has been attached to the case 28. In particular, according to the airbag apparatus S of the embodiment, the main opening 39R constituting the connector opening 38R is set to have an opening width dimension in the upward-downward direction larger than an outer diameter dimension of the right end section 53a of the inflator body 52 so that an approximately half region of the right end section 53a can be exposed, and also, the connector opening 38R itself is formed in a region provided by bending the right wall portion 36R. Accordingly, the connection port portion 55 can be easily exposed through the connector opening 38R and a connection operation of the connector 57 to the connection port portion 55 can be facilitated.

Therefore, according to the airbag apparatus S of the embodiment, even if the protruding pieces 44R are small, the protruding pieces 44R can accurately press an end surface (right end surface 53c) of the connection port portion 55 side of the inflator body 52.

Also, according to the airbag apparatus S of the embodiment, the inflator 51 includes the inflator body 52 and the retainer 60 for retaining the inflator body 52, and the retainer 60 has the bolts 69 arranged thereon. Accordingly, as compared with a case where blots protrude from an inflator itself, the inflator 51 can be easily manufactured and an increase in manufacturing cost can be inhibited. Also, the airbag 73 may be folded in a state where only the retainer 60 is received therein, and after the airbag 73 has been completely folded, the inflator body 52 may be inserted into the retainer 60 arranged in the airbag 73. Therefore, an operation of folding the airbag 73 and an operation of inserting the inflator body 52 can be performed at different sites separated from each other, thereby enhancing the degree of freedom in operation of assembling the apparatus. On the other hand, if this is not considered, the inflator may be configured so that the bolts may protrude from the inflator itself without using the retainer.

In addition, according to the airbag apparatus S of the embodiment, the case 28 includes two side members 49L and 49R respectively forming the left wall portion 36L and the right wall portion 36R, and the main member 48 forming a region extending from the upper wall portion 33 to the lower wall portion 34 through the bottom wall portion 29, and the side member 49R has a stepped portion so that a side thereof near to the bottom wall portion 29 is located inward in the left-right direction and a side thereof near to the protruding opening 28a is located outward in the left-right direction. Also, the connector opening 38R is arranged across the stepped portion. In addition, the protruding pieces 44R are arranged in a part of the peripheral edge of the connector opening 38R of the side member 49R, which is located near to the protruding opening 28a, and the guide portion 40R is arranged in a part of the peripheral edge, which is located near to the bottom wall portion 40R. Namely, according to the airbag apparatus S of the embodiment, the guide portion 40R and the protruding pieces 44R are all formed in the side member 49R, and therefore, an error in arrangement position thereof relative to each other can be hardly incurred, as compared with a case where a guide portion and a protruding piece are respectively arranged in different members. Also, as compared with a case where the case is integrally formed by deep drawing or the like, the case can be cheaply manufactured. On the other hand, if this is not considered, the case may be integrally formed by deep drawing or the like, and also even if the case is constituted of the side members and the main member, the guide portion, which is arranged more inward than the protruding pieces, may be formed in the main member. Also, although, in the embodiment, the inflator is configured to be attached to the bottom wall portion of the case, the inflator may be configured to be attached to the upper wall or the lower wall of the peripheral wall portion of the case. In addition, although, in the embodiment, the case is employed in which the bottom wall portion is arranged on the vehicle front side, and the vehicle rear side thereof is opened, the case is not limited to such a configuration and accordingly, for example, a case in which a bottom wall portion is arranged on the upper side thereof and the lower side thereof is opened may employed.

Further, according to the airbag apparatus S of the embodiment, the connector openings 38L and 38R are respectively formed in each of the side members 49L and 49. Therefore, the case 28 can be used in common for both of a case, where the inflator is mounted in a vehicle in such a manner that the connection port portion is located on the right side, and a case, where the inflator is mounted in a vehicle in such a manner that the connection port portion is located on the left side. For example, the case 28 can be used in common for both of a case, where the airbag apparatus is arranged in front of an assistant driver's seat, and a case, where the airbag apparatus is arranged in front of a driver's seat, thereby reducing manufacturing costs. If this is not considered, a case in which a connector opening is formed in only one side member may be naturally employed.

What is claimed is:

1. A knee protection airbag apparatus comprising:
   a case;
   an airbag folded and received in the case; and
   an inflator that is received in the case and that supplies an inflation gas to the airbag, wherein
   the case has a box shape including a bottom wall portion, a tubular peripheral wall extending from a peripheral edge of the bottom wall portion, and a protruding opening through which the airbag is capable of protruding,
   the inflator includes a gas discharging port arranged on a first end side of the inflator in an axial direction to discharge the inflation gas, and a connection port portion arranged on a second end side of the inflator to be connected to a connector connected with a lead wire extending from an airbag operation circuit,
   the inflator has a bolt arranged to protrude in a direction perpendicular to the axial direction, and the inflator is attached to the case by protruding the bolt from the case and fastening a nut to the bolt,
   a connector opening is formed on a side wall of the peripheral wall portion of the case at a side of the connection port portion of the inflator, and the connection port portion is exposed through the connector opening so that the connector is connected to the connection port portion of the inflator attached to the case,
   a protruding piece that prevents the inflator from falling-out is formed on a peripheral edge of the connector opening,
   a guide portion is formed at a location on the peripheral edge of the connector opening, which is located more toward an inside of the case in the axial direction than the protruding piece, and an outer peripheral part of the connection port portion side of the inflator slides on the guide portion when the inflator is attached to the case so that the inflator is guided by the guide portion to a location where falling-out of the inflator is prevented by the protruding piece,
   the guide portion includes guide surfaces arranged to oppose each other in a direction perpendicular to the axial direction of the inflator, and the guide surfaces are arranged so that a spacing distance therebetween is decreased toward a moving direction of the inflator when fastening the nut to the bolt, and the guide portion supports the inflator in a state that the inflator contacts the protruding piece.

2. The knee protection airbag apparatus according to claim 1, wherein
the inflator comprises an inflator body and a retainer that retains the inflator body, and
the retainer includes the bolt.

3. The knee protection airbag apparatus according to claim 1, wherein the case further comprises:
two side members including a left wall portion and a right wall portion arranged to oppose to each other in a left-right direction of the peripheral wall portion, and
a main body including the bottom wall portion and two opposing wall portions of the peripheral wall portion arranged in a direction perpendicular to the side members, wherein
the inflator is attached to the bottom wall portion,
at least one of the side members has a stepped portion in which a part of the stepped portion in a side of the bottom wall portion is located inward in the left-right direction and a part of the stepped portion in a side near to the protruding opening is located outward in the left-right direction, and the connector opening is arranged across the stepped portion, and
the protruding piece is arranged in a part of the peripheral edge of the connector opening of the side member in a side of the protruding opening, and the guide portion is arranged in a part of the peripheral edge in a side of the bottom wall portion.

4. The knee protection airbag apparatus according to claim 3, wherein the connector opening is formed in each of the side members.

5. The knee protection airbag apparatus according to claim 3, wherein
the at least one of the side members includes a base portion, a distal end portion, the stepped portion that is bent and that is arranged between the base portion and the distal end portion, and an inclined portion that is connected to the stepped portion and that is inclined toward the distal end portion,
the stepped portion is connected to the base portion and includes a rear section oriented outward in a left-right direction, and
the guide portion extends from the base portion.

6. The knee protection airbag apparatus according to claim 1, wherein the protruding piece includes a flat portion that contacts the connection port portion of the inflator.

7. The knee protection airbag apparatus according to claim 1, wherein the protruding piece is at least two protruding pieces located on opposing sides of the connector opening.

8. The knee protection airbag apparatus according to claim 1, wherein the guide surfaces of the guide portion are arranged on a protruding arc that extends from the peripheral edge of the connector opening.

9. The knee protection airbag apparatus according to claim 1, wherein the connection port portion of the inflator is configured to mate with both the protruding piece and the guide surfaces of the guide portion.

* * * * *